*INVENTOR.*
RONALD G. WAYNE

United States Patent Office 3,119,270
Patented Jan. 28, 1964

3,119,270
ADJUSTABLE RANGE TRANSDUCER
Ronald G. Wayne, 9820 Beachy Ave., Pacoima, Calif.
Filed Feb. 2, 1961, Ser. No. 86,623
7 Claims. (Cl. 73—410)

This invention relates to an adjustable range transducer and more particularly to a transducer, the full scale output of which may be made to correspond to a wide range of input variables.

The present invention is potentially applicable to any type of transducer in which the input variable may exist in the form of a displacement. An obvious example of this is the case of pressure transducers; and, in order to facilitate teaching of the underlying principles of the invention, a pressure transducer embodiment will be discussed in detail.

Pressure transducers used heretofore have most generally been of the variable reluctance type or the unbonded strain gage type. These devices are designed to produce a given full-scale output signal for a specified maximum pressure applied thereto. The construction of these prior devices does not lend itself to independent adjustment of the full-scale output signal over an appreciable range, and, any adjustment which may be provided, necessarily alters the resolution of the output indication. Therefore, for testing, research, and other applications requiring measurements over wide pressure ranges, a number of separate pressure transducers, each spanning a given range, have had to be employed. These separate transducers must be either manually placed into the pressure system, and exchanged with other transducers as the range of interest changed, or elaborate manifolding of the pressure line is required to switch into service the desired transducer.

There is provided by the pressure transducer embodiment of the present invention a novel and improved device for measuring either static or dynamic pressure over a very wide range of pressures, as for example, a low range from 0 to 10 p.s.i. and a high range from 0 to 10,000 p.s.i. This embodiment of the transducer may be readily and conveniently adjusted to provide a full-scale signal output for any selected range of pressures within the overall limits of the device, or for any band or pressures with a band of 100 p.s.i. or greater, for example, without seriously impairing the resolution of the output indication.

The novel design of the invention includes two independent adjusting means whereby the fixed parameters which establish the output level limits may be preselected. By means of these two independent adjustments, a fixed full-scale output may be obtained for any selected maximum input variable within the overall range of the instrument.

It is therefore a principal object of the invention to provide an adjustable range transducer.

Another object of the invention is to provide a displacement responsive transducer having dual adjustment means, individually variable for establishing the full-scale signal output.

Another object of the invention is to provide a novel and improved pressure transducer having independent range and output adjusting means.

Still another object of the invention is to provide a novel and improved photoelectric transducer having three independent means for varying the light flux received by the photoelectric element.

It is also an object of this invention, through simple and compact design, to incorporate the foregoing desiderata into a unit within the ramifications of volume and weight commensurate with conventional instrument practice.

These and other objects of the invention will be more completely understood from the following detailed description, taken in conjunction with the drawings, in which.

Figure 1:
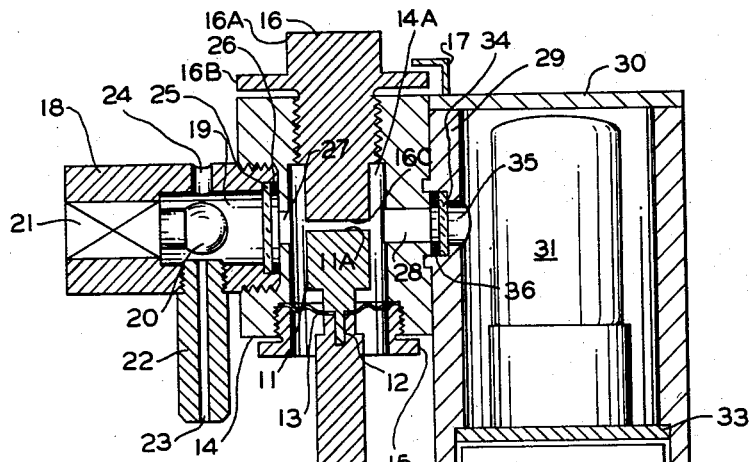
FIGURE 1 is an elevational view, partially in section, of a pressure transducer embodiment of the apparatus of the invention.

As may be seen in FIGURE 1, the device chosen to illustrate the invention is in an instrument of the pressure responsive type in which an elastic chamber exhausted of air comprises the actuating element. It is to be noted, however, that the exact nature and design of the subject device will in no way affect the scope and usefulness of the present invention which can be used in connection with many types of measuring, indicating and control instruments where the input variable may take the form of a physical displacement. The illustration which follows is therefore only to be construed as an example of what is considered a simple and logical application of the basic principle of the invention.

Referring now to FIGURE 1, it will be seen that the instrument here illustrated is enclosed in a housing which also serves as a support for the mechanism hereinafter described.

The instrument is coupled to the source of pressure to be measured by means of tapped port 1 located in block 2. Block 2 may be of cylindrical cross-section with port 1 centrally located in the lower face thereof. Pressure is communicated from port 1 into cylindrical recess 3 in which is mounted a pressure responsive element 4. The actuating element 4 may be a bellows sensor, substantially as shown, or may be any suitable aneroid capsule which is responsive to the pressure exerted on the elastic wall(s) of the exhausted chamber. The variation in pressure in recess 3 expands or compresses element 4 having a linear spring rate. Stem 5 is fixedly attached to the interior surface of the end wall of element 4. The opposite wall of element 4 is attached to cover plate 6 which in turn is mounted on block 2. Stem 5 passes through compliant spring disc 7 thereby providing resilient centering means which will permit translatory movement of stem 5. Vent apertures 7A communicates the interior of element 4 with the atmosphere. As can be seen, an increase in pressure in recess 3, applied via port 1, will cause stem 5 to move upward.

Ring 8 is annularly disposed about the peripheral edge of disc spring 7 and provides a convenient mounting means therefore. Rod 9 comprises an extension of stem 5 and is joined thereto by a keyed juncture 10 or other suitable means. Rod 9 may be of any suitable cross-sectional shape, such as of circular section. The upper end of rod 9 communicates with shutter 11 and is connected thereto by the keyed juncture 12 or other suitable means. Disc spring 13 centers and resiliently supports rod 9 and shutter 11. Spring 13 is mounted in a circular recess in housing 14 and held in place therein by threaded fastener 15. Thus, shutter 11 is suspended by means of a flexure system by means of which the movement of element 4 may be communicated thereto. Shutter 11 is, typically of circular cross-section and is free to move rectilinearly along its major axis within cylindrical opening 14A. Micrometer screw 16 is threadedly attached to housing 14 and has a manual knob portion 16A which may be manually rotated, and a flange portion 16B upon upon which are radially disposed indicia for indicating the depth to which micrometer 16 has been turned within housing 14. Pointer member 17 of any suitable configuration provides a reference for the indicia carried on flange 16B. A light source is mounted adjacent an aperture in housing 14 in such a manner as to dispose and direct its light flux substantially into opening 14A. To this end the light source optionally may be equipped with optical means such as a lens, a reflector, etc. as will be obvious to those skilled in the art. Lamp housing 18 is threadedly attached to housing 14. Lamp housing 18 is provided with a longitudinal cylindrical opening 19 in which is mounted a lamp 20 and a suitable receptacle 21 therefor. Tubular member 22 is threadedly connected with a transverse opening in housing 18 and provides a conduit 23 through which compressed air or other coolant fluid may pass for maintaining a desired operating temperature of lamp 20. The coolant fluid is exhausted through circular aperture 24. Circular glass window 25 is mounted in a circular recess opening 26, provided in the end of lamp housing 18 and has a transparent rectangular recticle to provide a parallel-sided aperture for the passage of light flux. This parallelism is essential for linear operation. Aperture 27 in housing 14 provides a light passage from lamp 20 into opening 14A. Light passing through aperture 27 will pass between the the face 16C of micrometer screw 16 and the face 11A of shutter 11 and enter aperture 28. Aperture 28 is located in housing 14 diametrically opposite from aperture 27. Shield 29, which may be of tubular cross-section is attached to housing 14 by any suitable means and is supported upon cover plate 6 and has its upper end closed by circular cover 30. Photo-sensitive means, preferably of the photo-emissive type, such as a phototube, or photomultiplier tube, is located within shield 29 and is adapted to receive light transmitted through aperture 35. Phototube 31, located within shield 29, is mounted in socket 32, which may be of any suitable and well known construction. Socket 32 may be carried on disc-shaped support member 33 in any convenient manner. The shield 29 and its covers 6 and 30 must exclude ambient light to the phototube 31. Diffusion glass 34 is mounted in aperture 35 and retained therein by retaining ring 36.

The face 16C of micrometer screw 16 and face 11A of shutter 11 define a light gate through which light flux from lamp 20 may pass and fall upon the light responsive element of phototube 31. Changes in displacement of shutter 11 will vary the opening through the light gate thus causing a variable output from phototube 31. Throughout the usual range of illumination, the signal current from the phototube is directly proportional to the illumination.

The light gate defines a zone through which the light received by the phototube must pass. Changes in pressure will compress or expand bellows 4 thus varying the area of the light gate. Since the light flux transmitted through the light gate decreases with an increase in pressure, the current output from the phototube will be inversely proportional to the applied pressure. Electrical indicating circuits which will directly indicate an inverse signal may be employed to display the pressure signal. These circuits are well-known in the art, in current use and should require no further explanation.

Turning micrometer screw 16 will vary the normal spacing between faces 16C and 11A thus establishing the normal area of the light gate. This micrometer adjustment setting comprises one of the independent range controls.

The voltage supplied to lamp 20 also may be independently varied. By varying both the lamp voltage and the normal light gate area the pressure range span of the transducer may be made without changing the full-scale output signal of the phototube. For example, if the full-scale setting of the micrometer adjustment closes the light gate to result in a very narrow spacing, the light flux from lamp 20 may be increased to maintain the desired output from the phototube. Conversely, the lamp voltage may be decreased if the fully open condition of the light gate is extremely wide.

Figure 2:
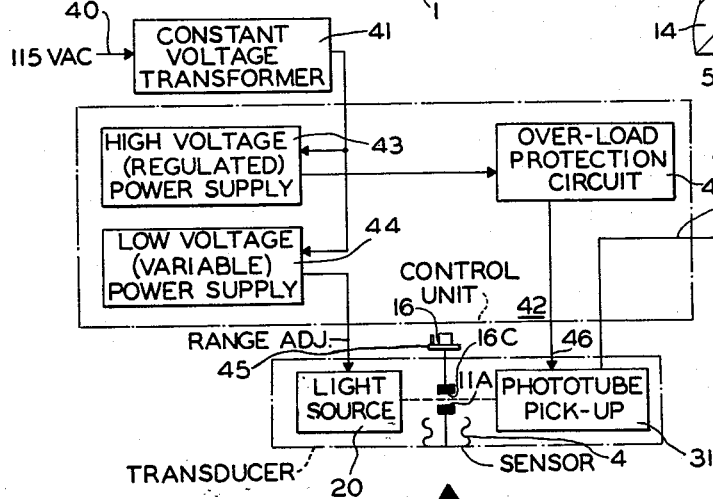
FIGURE 2 is a block diagram of electrical circuitry which may be employed in connection with the apparatus of FIGURE 1.

The phototube output current may be read on a meter calibrated in terms of pressure units as will become apparent from the discussion which follows in connection with FIGURE 2. The ancillary circuit elements, as shown in FIGURE 2, comprise a source of operating power 40 which, for example, may be obtained from the conventional 115 volt 60 cycle A.C. line. The input power is supplied to a constant voltage transformer 41 of the well known static-magnetic regulator construction of the type which will stabilize the line voltage to within approximately ±1 percent. The stabilized line voltage from transformer 41 is supplied to the control unit 42 which comprises known components including a high-voltage regulated power supply which provides the polarizing potential for the phototube and a low voltage variable power supply 44 for controlling the intensity of the light source 45 (e.g. lamp 20 of FIGURE 1). The high voltage from power supply 43 may be coupled to phototube 31 via an overload protection circuit 47 of any well-known and suitable construction. Circuit 47 is connected to phototube 31 via line 46. The output signal from phototube 31 is available on line 48 and may be connected to a suitably calibrated microammeter, a strip chart recorder, etc. The output signal may be used as a feedback control signal to maintain a given pressure in a system in a well-known manner. Also, it is contemplated that an automatic control circuit may be employed to vary the lamp supply voltage as the light gate is initially varied. Other applicable servo techniques will be apparent to those skilled in the art.

The output indicating means may be further provided with an index denoting a predetermined unit deflection, whereby the intensity of the light can be adjusted to provide a predetermined output signal from the phototube when the light gate is fully open. Also, the indicia on the flange 16B of the micrometer screw 16 will permit calibration of the light gate area.

As can be seen the apparatus of FIGURE 2 consists of a transducer and a control unit 42. The transducer is coupled to the control unit by interconnecting cables 45—46 which supply the required operating potentials to the light source 20 and the phototube 31, respectively.

By the application of pressure to port 1, the piston-like shutter 11 coupled to the pressure responsive bellows 4 is caused to move through a distance which is directly proportional to the applied pressure. Light flux of preset intensity passes through the light gate which is limited on one side by the adjustable micrometer and on the other side by the moving shutter 11. Once the desired full-scale range has been set, the area of the light gate is directly controlled by the travel of shutter 11; consequently, the amount of light which is permitted to pass through the light gate is a linear function of the displacement of shutter 11. The amount of current conducted by the phototube is directly proportional to the incident light obtained via the light gate. Since all elements of the system are linear and proportional, the output signal is dependent upon the applied pressure.

As will now be evident, since the size of the light gate opening and the light source intensity are independently adjustable, any range or band of pressure can be made to result in a full-scale signal.

It is contemplated that a number of bellows sensors, or other primary pressure responsive elements be interchangeable in the transducer to accommodate all desired pressure ranges over the extreme limits between 0 and 10,000 p.s.i. yet retain adequate resolution through any given range. Typically, three bellows elements may be employed having the following ranges and spring rates:

0–100 p.s.i.     1000 p.s.i./in.
0–1000 p.s.i.     10,000 p.s.i./in.
0–10,000 p.s.i.     100,000 p.s.i./in.

In order to set the system for any desired range of pressures and secure it for operation, the following procedure is employed:

(1) Fit the proper pressure responsive element to the transducer.

(2) Set the micrometer range adjustment to the desired maximum end of the selected pressure range. It will be noted that the indicia on the manual knob will read in increments of 0.1% of the maximum range of the pressure element employed. Thus for the 0–1000 p.s.i. attachment, the indicia read in increments of 1.0 p.s.i./.0001 inch.

(3) Set the light intensity (lamp voltage) control to the maximum desired voltage output, not to exceed the specified maximum for the lamp.

(4) Run test.

In order to set the unit for any band of pressures, and place the system in operation, the following procedure is used:

(1) Adjust the light intensity control to zero.

(2) Fit the proper pressure element to the transducer.

(3) Pressurize the transducer to the low end of the selected pressure band.

(4) Adjust the micrometer to the high end of the selected pressure band.

(5) Adjust the light intensity control to the maximum desired output voltage.

(6) Run test.

A second micrometer adjustment could be provided for the establishment of the low end of a desired pressure band. This would be desirable to eliminate the necessity of having to pressurize the unit for band setting.

Figure 3:
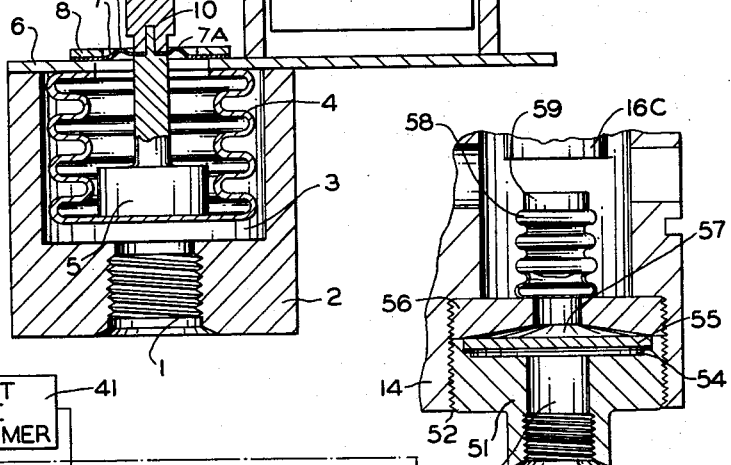
FIGURE 3 is a detailed sectional view of a modified form of the pressure responsive element portion of the apparatus of FIGURE 1.

There is shown in FIGURE 3 a modification of the invention utilizing an alternative form of pressure responsive element. In this embodiment, the bellows sensor 4 of FIGURE 1 and the related structural elements (1 through 13 and 15) are deleted and substituted with the apparatus of FIGURE 3 which includes elements 50 through 59, inclusive.

Looking now at FIGURE 3, the source of pressure to be measured is coupled to tapped port 50 located in plug element 51, the latter being of cylindrical cross section and carrying threads 52 which mate with the threaded interior of housing 14. Port 50 has a tubular conduit portion 53 which communicates with chamber 54 of enlarged cross section. Pressure in chamber 54 is applied to the boundary surface of diaphragm 55. A circularly relieved area of plug element 51 is adapted to receive diaphragm 55; the latter is retained in position by orifice disc 56 which is threadedly mounted in housing 14. The upper surface of diaphragm 55 communicates with opening 57 in orifice disc 56. Bellows sensor element 58 is in communication with area 57. The interior of area 57 and bellows 58 may be completely filled with a relatively non-compressible fluid. The upper end of bellows 58 is provided with anvil 59 which serves, in this modification, as the shutter element. Light passes between anvil 59 and the lower face 16C of micrometer screw 16, details of which correspond to similarly numbered parts of FIGURE 1.

As a result of Pascal's law, the application of a force to diaphragm 55 will result in a force being applied to bellows 58 such that the pressure at the two elements is equal. By this means, a large force applied to diaphragm 55, exerted through a small distance, will result in a small force being obtained through a large distance at bellows 58. Thus, a mechanical advantage is obtained since an increase in pressure on any part of the confined liquid causes an equal increase throughout the liquid.

Diaphragm 55 is relatively stiff and is therefore capable of withstanding very large pressure changes without damaging distortion taking place. The relatively small excursion of diaphragm 55 through a relatively large pressure change, will result in a hydraulically amplified displacement of anvil 59 due to the above described principle.

It should be understood that various other modifications of the apparatus may be employed and that the light gate may be opened or closed by displacement from means other than pressure responsive means.

Additional modifications will suggest themselves to those skilled in the art which will fall within the intended scope of the invention. For example, various types of well-known feed-back and stabilizing circuits may be employed in connection with the phototube circuit in order to compensate for possible aging and/or drift effects in the phototube which may accrue over long periods of time. Also, modifications in the mechanical structure, such as the inclusion of a vernier index on the micrometer screw adjustment, will suggest themselves to those skilled in the art. Since it is a well-known fact that photoelectric techniques for measuring displacement may be extremely sensitive, say to one millionth of an inch, the optimum accuracy of the transducer of the present invention depends only upon the actuating elements and is obtainable as far as the art of craftsmanship is capable.

It is to be pointed out that the ancillary circuits disclosed are merely illustrative, and accordingly then may take other forms. As is further apparent, the application of the present invention is not limited to a pressure measurement, but may be applied to measure any condition which may be expressed as a physical displacement.

Since certain changes in the invention may be made without departing from the spirit and scope thereof, it is intended that all matters contained in the foregoing description, and shown in accompanying drawings, should be interpreted as illustrative and not in a limiting sense.

What is claimed is:

1. A pressure transducer comprising a housing, bellows means located within said housing and responsive to pressure applied thereto, a light gate comprising an adjustable means and a piston means defining a space therebetween, said piston means being coupled to said bellows means for translatory movement therewith towards and away from said adjustable means to vary the size of said space, a light source carried by said housing and adapted to provide a beam of light passing through said light gate, and light responsive means adapted to receive light from said light source via said light gate, the movement of said bellows means causing said light gate to vary the intensity of light on said light responsive means as a function of the applied pressure.

2. A pressure transducer as defined in claim 1 wherein said adjustable means comprises a micrometer screw, said screw having a flat face at the light gate end and a manual adjustment knob at the other end.

3. A pressure transducer as defined in claim 1 having means for controlling the intensity of said light source to independently vary the intensity of light on said light responsive means.

4. A pressure transducer comprising a housing, pressure responsive diaphragm means located within said housing, a port communicating the exterior of said housing with one surface of said diaphragm means, bellows means located within said housing and having a passageway communicating the interior of said bellows means with the other surface of said diaphragm means, a shutter closing one end of said bellows means, said passage being filled with a relatively non-compressible fluid for transmitting and amplifying movement applied to said diaphragm means via said port to said shutter, a light gate comprising an adjustable means and said shutter defining a space therebetween, said shutter being coupled to said bellows means for translatory movement therewith toward and away from said adjustable means to vary the size of said space, a light source carried by said housing and adapted to provide a beam of light passage through said light gate, and light responsive means adapted to receive light from said light source via said light gate, the movement of said bellows means causing said light gate to vary the intensity of light on said light responsive means as a function of the applied pressure.

5. A pressure transducer as defined in claim 4 wherein the area of said diaphragm means in communication with said port is greater than the area of said bellows means thus providing an amplified displacement of said shutter in response to a given displacement of said diaphragm means.

6. A pressure transducer as defined in claim 4 wherein said adjustable means comprises a micrometer screw, said screw having a flat face at the light gate and manual adjusting means at the other end.

7. A pressure transducer as defined in claim 4 having means for controlling the intensity of said light source to independently vary the light flux on said light responsive means.

References Cited in the file of this patent

UNITED STATES PATENTS

| | | |
|---|---|---|
| 2,059,504 | Whitman | Nov. 3, 1936 |
| 2,141,175 | Dawson | Dec. 27, 1938 |
| 2,277,285 | Woodling | Mar. 24, 1942 |
| 2,832,259 | Merton | Apr. 29, 1958 |
| 2,958,254 | Kittelberger et al. | Nov. 1, 1960 |